(12) United States Patent
Juhasz et al.

(10) Patent No.: US 8,086,724 B2
(45) Date of Patent: Dec. 27, 2011

(54) CONFIGURATION OF NETWORK'S NODES IN A TELECOMMUNICATION SYSTEM

(75) Inventors: Attila Juhasz, Budapest (HU); Andras Veres, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1201 days.

(21) Appl. No.: 11/813,726

(22) PCT Filed: Jan. 12, 2005

(86) PCT No.: PCT/EP2005/050116
§ 371 (c)(1),
(2), (4) Date: Jul. 11, 2007

(87) PCT Pub. No.: WO2006/074826
PCT Pub. Date: Jul. 20, 2006

(65) Prior Publication Data
US 2009/0287811 A1    Nov. 19, 2009

(51) Int. Cl.
*G06N 5/02* (2006.01)
*G06F 11/07* (2006.01)
*G06F 15/173* (2006.01)

(52) U.S. Cl. ........... 709/224; 709/223; 709/221; 714/26
(58) Field of Classification Search .................. 709/224, 709/220–222, 227–229; 714/25–26, 47–48; 702/179, 182–185
See application file for complete search history.

(56) References Cited

U.S. PATENT DOCUMENTS

| | | | | |
|---|---|---|---|---|
| 6,006,016 | A  * | 12/1999 | Faigon et al. | 714/48 |
| 6,654,914 | B1 * | 11/2003 | Kaffine et al. | 714/43 |
| 7,249,286 | B1 * | 7/2007 | Krishnan | 714/39 |
| 2002/0077711 | A1 | 6/2002 | Nixon et al. | |

* cited by examiner

*Primary Examiner* — Wing Chan
*Assistant Examiner* — Ruolei Zong

(57) ABSTRACT

The idea of the present invention providing a solution for configuration problems of a node is based on the following components. A problem recognition system, which analyses performance indicators and identifies root causes, so that signatures can be attached to a found problems. Furthermore there is a signature based filtering system, which looks for transactions satisfying signatures. A customer identification system labels the transactions with the subscriber identify. A solution feedback system generates feedback event to the end node according to the rule of the signature.

14 Claims, 3 Drawing Sheets

CONFIGURATION OF NETWORK'S NODES IN A TELECOMMUNICATION SYSTEM

TECHNICAL FIELD OF THE INVENTION

Figure 1:
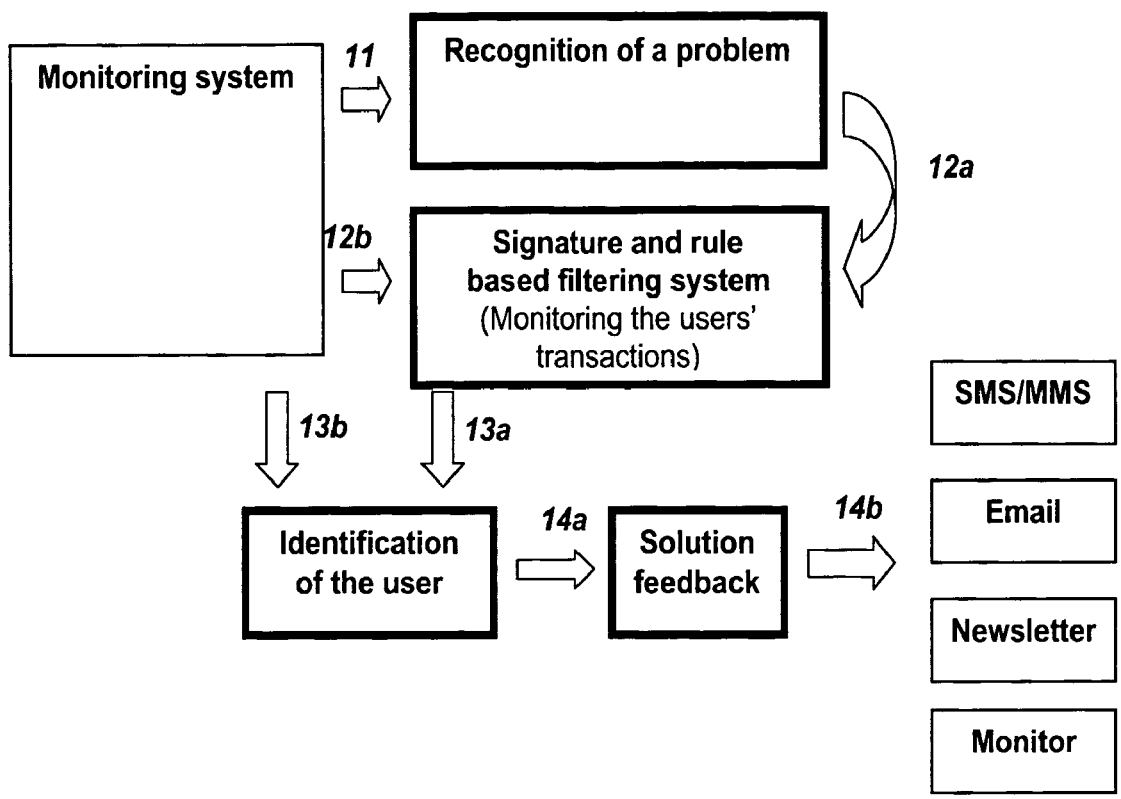

The present invention relates to configuration of network nodes in a telecommunication network. In particular it provides a semi-automatic troubleshooting methodology of mobile-network subscriber problems.

The present application might be used for improving the provision of services to the end users due to the fast and effective reaction of the system to the occurring end user's problems based on the inappropriate configuration In the current telecommunication networks there is a number of parameters that need to be set, in both in a terminal and in a system. The parameters are very different and are to be configured on different communication layers and in different nodes, including terminals and application servers. Some examples of parameters being to be configured are account settings, IP settings, QoS settings like different transmission rates on the intermediate links or server and user settings. Therefore, there is a plurality of parameters, which either have to be set or can be set optionally, the configuration of which, however, considerably influences the efficiency of the transmission. For example the transmission parameters referring to the transmission mode, namely the so-called transparent or the so-called non-transparent mode, are necessary to be agreed upon. The corresponding transmission mode is selected by the user and depends on the underlying network. Thus, it is required that the user has knowledge about the configuration of a connection. The two above-mentioned parameters, transparent/non-transparent, only form one part out of a plurality of different services. Their number and kind varies in response to the network systems and offered services.

When looking at a connection, at least the communicating end points and at least one intermediate node are involved in data transmission. The intermediate node has the task to assure a parameter agreement such that a safe and stable data transmission between the communicating data terminal equipment is guaranteed. The parameter adjustment between the data terminal equipment takes place in the set-up phase of the connection. Moreover also user's preferences are to be considered.

However the intermediate node might take care of the configuration issues on the lower protocol layers and it is difficult to establish or to ensure a communication between terminals if the connection is set up via several networks, where intermediate nodes use a different kind of signaling, or a new service is implemented. Further more and more services use dedicated servers or server platforms with extra settings that need to be taken care of.

U.S. Pat. No. 5,452,287 considers a negotiation strategy between a calling and a called user in order to obtain and coordinate their parameters. The negotiation takes place between source and destination edge node, which maintains call endpoint information for each user. The result of the negotiation is a combination of the parameters from the calling and called parties. For this solution it is required that the edge nodes maintain information about the end users in order to consider their preferences. This document gives a solution for configuration of the terminals. However this end-to-end negotiation is performed without involving the network and without considering the parameters of the network's services. It provides merely a solution to bring users' parameters in alignment therewith, wherein a terminal has to be aware of its parameters in order to forward them to the edge nodes.

On one side the physical parameters might be configured in an inappropriate way, on the other side subscriber perceived problems also might arise from terminal and service configuration issues on the upper layers, like for example on the application layer.

Subscribers are very sensitive to end-to-end performance issues, and they either ignore the case or start complaining to the customer service department. Most mobile operators and terminal vendors provide three ways to handle configuration problems on the terminal side.

Terminals being directly pre-configured for the operator's services are sold. Of course this solution is too rigid. A pre-configured terminal rarely matches the needs of the user, who may need to change the configuration anyway. Also, this solution is not prepared for new services that are introduced after the terminal was sold.

Another method is realized by means of an automated terminal configuration services. This might be realized by sending for example a SMS message to the user. The drawback of this solution is that these are pro-active, but non-interactive, only dealing with the terminal, and cannot react to a problem in a real-time manner/environment, where problems might occur in many unexpected ways. Moreover the user must know the nature of the problem. For this reason the user would have to debug the own terminal to find out exactly what part of the configuration should be changed.

The third solution is to have centers for customer service help. Customer service centers provides feedback to the users based on the experienced knowledge of the values customer service personal. The disadvantage is that the support of new-implemented services can not be supported.

In the following the Multimedia Messaging Service MMS is taken as an example of the introduction of a new service. The MMS is a standard that lets users of MMS supportive mobile phones send and receive messages with formatted text, graphics, photographs, audio and video clips. Video sequences, audio clips and high-quality images can be downloaded to the phone from suitable network sides, transferred to the phone in a MMS message. MMS messages can be sent either to another MMS-enabled mobile phone or to an e-mail address and a MMS message can for example be a photo or picture post card annotated with text and/or an audio clip, a synchronized playback of audio, text, photo and video emulating a free-running presentation or a video clip. Mobile telecommunications networks, such as the third-generation wireless networks (UMTS Universal Mobile Telecommunication System) or GPRS (General Packet Radio System) aim to provide services such as voice, data, and multimedia via computing devices over network infrastructures. However such systems and the end terminals are to be configured for the new service. Moreover, existing networks, like the GSM networks are to be reconfigured in order to support the MMS technology. In this example an additional infrastructure, a Multimedia Messaging Centre (MMC), has been introduce for said support purpose.

Therefore an introduction of a new service requires introduction of new node and a configuration or reconfiguration of a network system. Recent measurements show that most of the service attempts fail due to the configuration problems. It is expected that further new services will be introduced, and thus their configuration and maintenance becomes even more difficult.

SUMMARY AND DESCRIPTION OF THE INVENTION

It is an object of the present invention to provide a solution for configuration of nodes, in particular of end terminals, in order to achieve fast and effective reaction to end user problems and respectively in order to include an efficient provision of services in a telecommunication network.

The invention is disclosed in claims 1, 9 and 10. Advantageous embodiments are described in the dependent claims being disclosed in the corresponding parts of the description.

In respect to claim 1 the present invention provides a solution for a configuration of a user part for a communication network having said user part and a system part wherein said system part provides a service being accessible by the user part and wherein said method has the following steps being performed at the system part. A problem recognition procedure is provided for recognising a problem occurring when transmitting data traffic of the user part. In case a problem is recognised, a signature for said problem is generated, wherein said signature includes rules which are to be matched for solving the problem. Further a monitoring system is provided for monitoring data traffic of the user part. A signature based filtering procedure for filtering the monitored data traffic of the user part being comparable with the rules of the signature is provided. In order to identify the user part, an identification procedure is provided. Finally a solution feedback procedure for configuration of the user part, wherein said solution feedback procedure is based on the rules of the signature is provided. Said rules are also provided to the user part for a configuration purpose.

The present invention discloses also a system adapted to configure a user part for a communication network having said user part and said system part wherein said system part provides a service being accessible by the user part and wherein said system part has the following components. A problem recognition system is adapted to recognise an occurrence of a problem when transmitting data traffic of the user part. A signature generation system is adapted to generate for the recognised problem a signature including rules, which are to be matched for solving the problem. A monitoring system for monitoring data traffic of the user part is provided, wherein a signature based filtering system for filtering the monitored data traffic is used to compare said traffic data with the rules of the signature. In case a matching problem is found an identification system for identifying the user part corresponding to the filtered data traffic is used. For the configuration of the user part, a solution feedback system is used, wherein said solution feedback system is based on the rules of the signature and is adapted to provide said rules to the user part for configuration purpose.

The advantage of the present invention is that it provides a proactive, on-line configurable, terminal and services oriented solution feedback mechanism for the network. Said feedback information might be utilized for example by a subscriber or by a customer care department or by an operation management as well.

Thus the present solution speeds up troubleshooting for the operator and for an individual subscriber providing an immediate feedback of an implemented service.

Figure 2:
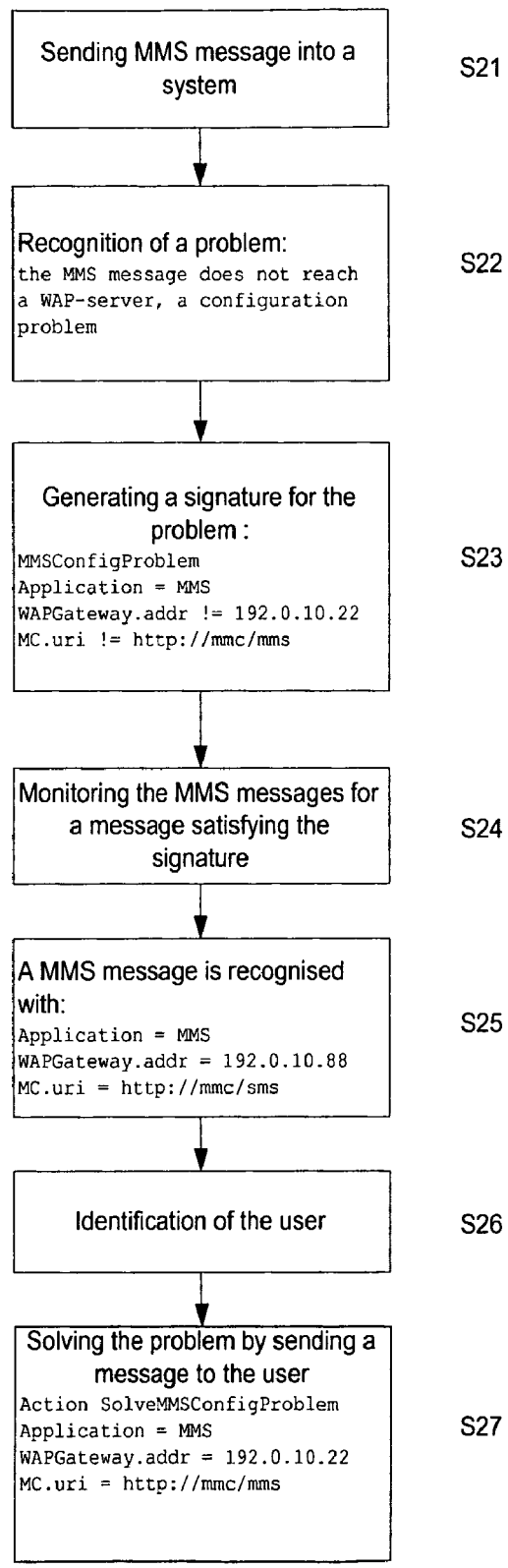
Figure 3:
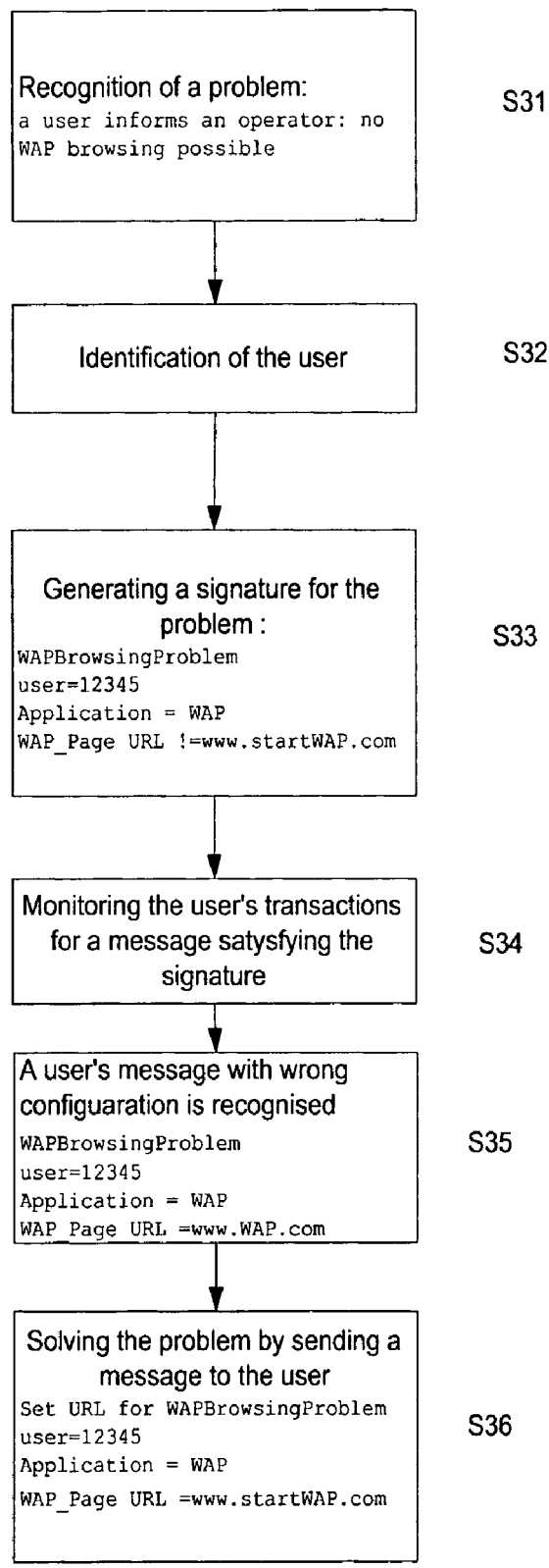

In the following preferred examples of the present invention shall be described in detail, in order to provide the skilled person with thorough and complete understanding of the invention, but these detailed embodiments only serve as examples of the invention and are not intended to be limiting. The following description shall make reference to the enclosed drawings, in which FIG. 1 shows a schematic representation of an automated trouble shouting system according to the present invention, FIG. 2 shows a flowchart of an embodiment of the present invention for configuration of a MMS service, FIG. 3 shows a flowchart of an embodiment of the present invention for configuration of a Web service.

It should be noted that the term "part", "node", "module" in the context of the present invention refers to any suitable combination of hardware and software for providing a predetermined functionality in the communication network. In this way, said terms generally refers to a logical entity that can be spread out over several physical entities of the network, but can also refer to a physical entity located in one physical location.

Furthermore a "part", "node" or "module" in the context of the present invention refers to any entity in a telecommunication network, which is to be configured in an appropriate way in order to support a provided service. It might be for example a system node, server or user's terminal.

Furthermore it should be noted that a service might be provided on any protocol layer, for example on the application layer but also on the physical layer, wherein the provision of said service requires transmission of any data through a communication network.

Preferably, the communication network is a mobile communication network, e.g. is a mobile communication network operating according to GSM, GPRS (General Packet Switched Radio) or UMTS (Universal Mobile Telephone System) or any 3G system like for example EDGE, WCDMA, CDMA2000. However, the present invention is also applicable in any communication network.

In this connection it is also to be mentioned that the steps described in the present invention does not mean that said steps are to be performed subsequently. The present invention describes merely different functional modules and interfaces thereof. For example the determination of the user's identification might be performed also before performing the signature based filtering procedure.

The present invention is based on the fact that it is the network only where sufficient information is easily available for solving configuration problems. Thus the present invention builds on accessing and processing traffic within the network. Therefore it is to be ensured that the present invention is based on an on-line user traffic monitoring system. Said monitoring system is to be capable of understanding data being sent on different protocol layers, like for example on the application protocol layer and of identifying the end terminal at the same time. Currently some systems allowing monitoring of exchange user's data are known, like for example the monitoring system disclosed in U.S. Pat. No. 6,807,156.

In the following an embodiment of the present invention in respect to FIG. 1 is given. Said embodiment describes a configuration of an application service for a subscriber being example of an end node.

FIG. 1 depicts a schematic representation of an automated trouble shouting system according to the present invention. In particular it shows a mobile network providing a monitoring system being responsible for monitoring data going through the network and for provision of the result of the monitoring to the problem recognition and to the signature based filtering system. Furthermore, the customer identification and the solution feedback functionality, which might be implemented in any preferable way, for example as SMS/MMS, Email, Newsletter, are depicted. Additional the FIG. 1 shows interfaces depicted as arrows between the certain functional modules.

As already mentioned above some example for realisation of a monitoring system are known and thus an existing monitoring system might be used for the purpose of the present invention. In this connection the system monitors subscriber traffic. Said monitoring is performed in a non-intrusive way and reconstructs protocol level flows, and statistics per each subscriber. It is preferably to store the parameters of the traffic flows and the statistics. Herein different kinds of statistics might be maintained. Useful information is the success rates of service usage. In the following it is assumed that said success rates of service usage is recorded as the so-called Key Performance Indicators KPI. Moreover also the failures of application transactions are evaluated (Root Cause Analysis) and also stored.

The KPIs and transaction properties, like for example success rate of sending MMS messages, WAP connection setup success rate; reason code for unsuccessful connect, are continuously evaluated and monitored by a decision-supporting system. That means that thresholds and critical values are set for KPIs and transaction properties, which are continuously compared against the recorded values. If a certain value (KPI or a transaction property being measured in total or per subscriber) passed over the critical value an indication to the system is generated, for example in form of an alarm towards the network management system.

In case of alarm generation, the operator of the system is in possession of all necessary information to find out the details and root cause of the problem. According to FIG. 1 over the interface 11 the necessary information is sent to the problem recognition unit, which analyses the problem for finding the cause. If the cause is found, the system operator can generate a rule set and signature set for the specific problem, interface 12a. Thus, the operator uses the monitoring application's analyses functions to excavate the details for the signature and rule sets. This is done manually using the competence and technical understanding of the underlying technology and the Monitoring system of the operator, or a knowledge-based system can also help the operator identifying the root-cause and the signature.

The task of the rule and signature system is to monitor user transactions and search for problems matching signature. For each problem set there is a matching solution set. The search for configuration problems is done in real-time by means of the interface-12b in FIG. 1. That means in case of an already known configuration problem a matching signature with a pre-defined rules is available, otherwise at first an appropriate signature with certain rules is to be defined.

It is to be noted that since a huge number of transactions may be generated it is preferably for the implementation purpose to access the transaction log files of the monitoring application directly. For example an existing real-time watchdog might read and analyse the log files to find the matching signatures and to trigger an action afterwards.

Returning to FIG. 1, in case a matching problem is found, the signature based problem filtering system enters the customer identification stage by means of providing a subscriber identification and an action to carry out over the interface-13a.

Based on the subscriber identification the Customer identification module decodes the subscriber's true identity, for example a phone number using for example the monitoring system, Interface-13b or even a name by using external databases. The decoding of the phone number might be for example during the user's authentication, when the monitoring system's traffic database is built up.

When the customer and the signature that fired an alarm event are identified, both information are routed towards the solution feedback module, Interface-14a. This component generates action to provide feedback towards the end part, for example to the operator and/or to the subscriber. The solution can be a simple action, like for example sending of a SMS message, or complex action such as sending of the failed transaction details to the console of the network management system. Interface-14b.

The implementation of the dispatching of the feedback message might be carried out in any suitable and preferable way. For example a direct method can be chosen like sending an SMS, MMS or (E-)mail. Indirect usage of the feedback dispatching can be a signal (SNMP, SQL insert, customer support monitoring application or trouble ticket, etc) towards the operator's network management system or other node for customer care.

In the following two embodiments of the present invention in respect to FIG. 2 and FIG. 3 are presented. Both embodiments show a flow chart with steps according to the present invention.

FIG. 2 presents steps showing a configuration of a MMS service, wherein as already mentioned said steps are not mandatory to be performed in a subsequent way.

In step S21 a MMS message is sent into a system. The system recognises for example that the MMS send success ratio is below the expected value for some subscribers. An alarm is generated towards the network management system, where the operator finds out that considerable number of failures are caused by no response from the WAP gateway. It turns out that the IP address of the WAP gateway and MMS server setting are incorrect in the users' terminal. Thus, in step S22 the problem is recognised and a signature including rules is generated in S23, for example by the operator. The signature consists of a few filters such as the application is a MMS, the WAP gateway IP address and the MC url are not in the expected list, etc. In the present embodiment the signature might have the following form:

```
Define RuleSet MMSConfigProblem [
    Application = MMS
    WAPGateway.addr != 192.0.10.22
    MMC.uri != http://mmc/mms
] Action SolveMMSConfigProblem
```

The last line means that if a transaction satisfies this signature, it triggers a rule that will initiate the action defined for this filter.

In the next step, S24 the MMS messages are monitored for a message satisfying the above defined signature. In step S25 such message is recognised with the parameters:

```
Application = MMS
WAPGateway.addr = 192.0.10.88
MMC.uri = http://mmc/sms
```

The filtered information shows that on the user's side the configuration is set for sending SMS and not MMS messages. Therefore in step S26 the identification of the user is determined and feedback message is sent to the user, S27.

As already mentioned the feedback message might have any suitable form. In this example a general description of the correct information that is to be sent to the user is given:

```
Action SolveMMSConfigProblem:
Application = MMS
WAP.Gateway.addr = 192.0.10.22
MMC.uri = http://mmc/mms
```

As one of the possible alternative for informing the user about the action to be taken might be by means of a SMS message as transport possibility with the following format.

SolveMMSConfigProblem [
SendSMS "Your terminal has a wrong MMS configuration. To solve your MMS problem, modify the MMS server URL to the following setting: http://mmc.operator.com/mms, and the WAPGateway.addr to WAPGateway.addr=192.0.10.22"]

In the presented embodiment, the system has recognised according to some statistics, namely the MMS send success ratio, that some subscribers have problems reaching the WAPGateway. Due to the fact that the ration was below a certain value an alarm was generated. However it is also foreseen that an individual user generates an indication for monitoring data. This embodiment is presented in the following in respect to FIG. 3.

In step S31 a user informs an operator that WAP browsing is not possible.

In the next step the user is identified, S32 and in step S33 a signature and rule is set for the user. Said signature might have the following form:

```
RuleSet WAPBrowsingProblem [
    User=12345
    Application = WAP
    WAP_Page URL != www.startWAP.com]
```

In the next steps, S35 the subscriber's WAP transaction are monitored for finding a transaction satisfying the defined signature. The result of the monitoring is shown in step S35, which is that the requested WAP page URL is incorrect set.

```
WAPBrowsingProblem [
    User=12345
    Application = WAP
    WAP_Page URL = www.WAP.com]
```

In S36 the user might be informed to examine the bookmark of the start-page additional an explanation might be given for setting it in a right way giving the right parameters, like

```
Set URL for Solving WAPBrowsingProblem [
    User=12345
    Application = WAP
    WAP_Page URL = www.startWAP.com]
```

If necessary, the operator can check if the user has set it correctly by watching at the next WAP transaction of the subscriber.

The present invention shows some embodiment for the application layer. However the present invention should not be seen as being restricted to this protocol layer. The feedback on occurring problems might be generated on every layer, for example on the physical or transport layer.

Moreover the present application is not only restricted to the configuration of user's terminal. It might be applicable for every node being involved in a data transmission within a network, which is able to change its configuration parameters according to the received rules.

The invention claimed is:

1. A method of configuration of a user part for a communication network having said user part and a system part wherein said system part provides a service being accessible by the user part, the method comprising the following steps being performed at the system part:
   providing a problem recognition procedure for recognizing a problem occurring when transmitting data traffic of the user part wherein said data is related to the provision of the service,
   generating for the problem a signature including rules which are to be matched for solving the problem,
   providing a monitoring system for monitoring data traffic of the user part wherein said data is related to the provision of the service,
   providing a signature based filtering procedure for filtering the monitored data traffic being comparable with the rules of the signature,
   performing an identification procedure for identifying the user part corresponding to the filtered data traffic,
   providing a solution feedback procedure for configuration of the user part: wherein said solution feedback procedure is based on the rules of the signature and provides said rules to the user part for configuration purpose, and
   wherein the signature based filtering procedure for filtering data traffic of the user part by means of comparing with the rules of the signature is performed in a real-time.

2. The method according to claim 1 wherein the problem recognition procedure includes generating of an alarm when a problem occurs and finding the root cause of the problem.

3. The method according to claim 1 wherein the problem recognition procedure is activated when the user part informs about an occurring problem.

4. The method according to claim 1 wherein the signature is generated by an operator or automatically by the system part according to the gathered history.

5. The method according to claim 1 wherein the monitoring system for monitoring data traffic of the user part monitors data of users in a non-intrusive way and reconstructs data flows per each user part.

6. The method according to claim 1 wherein the identification procedure for identifying a user part is performed by means of contacting a customer identification module for determining the subscriber's true identity.

7. The method according to claim 1 wherein the solution feedback procedure is performed by means of sending a direct message to the user part or indirect by informing an certain node for taking care on solving the problem.

8. A system part adapted to configure a user part for a communication network having said user part and said system part wherein said system part provides a service being accessible by the user part, said system part comprising:
   a processor coupled to memory,
   a problem recognition system being adapted to recognize an occurrence of a problem when transmitting data traffic of the user part wherein said data is related to the provision of the service,
   a signature generation system being adapted to generate for the recognize problem a signature including rules which are to be matched for solving the problem,
   a monitoring system for monitoring data traffic of the user part wherein said data is related to the provision of the service,
   a signature based filtering system for filtering the monitored data traffic being comparable with the rules of the signature, an identification system for identifying the user part corresponding to the filtered data traffic, a solution feedback system for configuration of the user part, wherein said solution feedback: system is based on the rules of the signature and is adapted to provide said rules to the user part for configuration purpose, and wherein the signature based filtering system filters data traffic of the user part by means of comparing with the rules of the signature in real-time.

9. The system according to claim 8 wherein the problem recognition procedure includes generating of an alarm when a problem occurs and finding the root cause of the problem.

10. The system according to claim 8 wherein the problem recognition system is activated when the user part informs about an occurring problem.

11. The system according to claim 8 wherein the signature generation system is initiated by an operator or automatically by the system part according to the gathered history.

12. The system according to claim 8 wherein the monitoring system for monitoring data traffic of the user part monitors data of users in a non-intrusive way and reconstructs data flows per each user part.

13. The system according to claim 8 wherein the identification system for identifying a user part accesses a customer identification module for determining the subscriber's true identity.

14. The system according to claim 8 wherein the solution feedback system sends a direct message to the user part or indirectly by informing an certain node for taking care on solving the problem.

* * * * *